United States Patent
Feng et al.

(10) Patent No.: US 9,930,070 B2
(45) Date of Patent: Mar. 27, 2018

(54) MODIFYING SECURITY POLICIES OF RELATED RESOURCES

(71) Applicant: International Business Machines Corporation, Armonk, NY (US)

(72) Inventors: Hao Feng, Beijing (CN); Shuo Li, Beijing (CN); Shengyan Sun, Beijing (CN); Jun Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 24 days.

(21) Appl. No.: 14/938,218

(22) Filed: Nov. 11, 2015

(65) Prior Publication Data
US 2017/0134430 A1    May 11, 2017

(51) Int. Cl.
H04L 29/06    (2006.01)

(52) U.S. Cl.
CPC .......... H04L 63/20 (2013.01); H04L 63/1425 (2013.01)

(58) Field of Classification Search
CPC .............................. H04L 63/145; H04L 63/20
See application file for complete search history.

(56) References Cited

U.S. PATENT DOCUMENTS

| | | |
|---|---|---|
| 6,321,201 B1 | 11/2001 | Dahl |
| 7,669,051 B2 | 2/2010 | Redlich et al. |
| 8,135,953 B2 | 3/2012 | Kumoluyi et al. |
| 8,676,710 B2 | 3/2014 | Mane et al. |
| 8,806,621 B2 | 8/2014 | Maguire |
| 8,887,279 B2 * | 11/2014 | Dheap ..................... H04L 63/20 726/1 |
| 8,910,278 B2 | 12/2014 | Davne et al. |
| 9,003,502 B2 | 4/2015 | Zhang et al. |
| 9,240,996 B1 * | 1/2016 | Sinnema ................. H04L 63/10 |
| 9,363,280 B1 * | 6/2016 | Rivlin ................. H04L 63/1416 |
| 9,705,888 B2 | 7/2017 | McAlister |
| 2008/0212777 A1 | 9/2008 | Dhawan |
| 2011/0173693 A1 * | 7/2011 | Wysopal ............. G06F 11/3612 726/19 |

(Continued)

FOREIGN PATENT DOCUMENTS

| | | |
|---|---|---|
| CA | 2625718 A1 | 4/2007 |
| CN | 103763355 A | 4/2014 |

OTHER PUBLICATIONS

Jeong, "A flexible database security system using multiple access control policies", PDCAT'2003, Proceedings of the Fourth International Conference, Aug. 27-29, 2003, 2 pages, <http://ieeexplore.ieee.org/xp/articleDetails.jsp?&arnumber=1236296>.

*Primary Examiner* — Mohammad A Siddiqi
(74) *Attorney, Agent, or Firm* — Daniel R. Simek

(57) ABSTRACT

A method for a managing security in a networked computing environment. The method included a processor detecting an unauthorized activity that is targeting a first computing resource. The method further includes a processor determining a first group of computing resources that includes the first computing resource. The method further includes a processor determining a first threat level for the detected unauthorized activity. The method further includes a processor identifying a first security policy of a plurality of security policies of a networked computing environment based at least in part on the determined first group of computing resources and the determined first threat level for the detected unauthorized activity.

18 Claims, 7 Drawing Sheets

(56) References Cited

U.S. PATENT DOCUMENTS

| | | | |
|---|---|---|---|
| 2013/0024937 A1* | 1/2013 | Glew | G06F 21/577 |
| | | | 726/23 |
| 2013/0227697 A1* | 8/2013 | Zandani | H04L 63/1433 |
| | | | 726/25 |
| 2014/0165130 A1* | 6/2014 | Zaitsev | G06F 21/00 |
| | | | 726/1 |
| 2014/0189865 A1 | 7/2014 | Abuelsaad et al. | |
| 2015/0058988 A1* | 2/2015 | Katz | H04L 63/145 |
| | | | 726/23 |
| 2016/0164918 A1 | 6/2016 | Satish et al. | |

* cited by examiner

MODIFYING SECURITY POLICIES OF RELATED RESOURCES

BACKGROUND OF THE INVENTION

The present invention relates generally to security management, and more particularly to the management of system security in a networked computing environment.

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. The resources may include physical or logical computing engines (e.g., virtual machines (VMs)), servers and devices, device memory, and storage devices; such as a storage area network (SAN) or a network-attached storage (NAS) solution. For example, information resources, such as data files, databases, image files, etc., as well as components and/or computing resources (e.g., memory, persistent storage, networking systems, etc.) within a cloud computing environment, can be widely distributed. In addition, an advantage of cloud computing environments is that users and developers have tools to enable the creation and utilization of services in a condensed period of time.

SUMMARY

According to aspects of the present invention, there is a method, computer program product, and/or system for managing security in a networked computing environment. The method includes one or more computer processors detecting an unauthorized activity that is targeting a first computing resource. The method further includes one or more computer processors determining a first group of computing resources that includes the first computing resource. The method further includes one or more computer processors determining a first threat level for the detected unauthorized activity. The method further includes one or more computer processors identifying a first security policy of a plurality of security policies of a networked computing environment based at least in part on the determined first group of computing resources and the determined first threat level for the detected unauthorized activity.

DETAILED DESCRIPTION

Embodiments of the present invention recognize that as the infrastructures for users to execute workloads in cloud environments continue to grow, available security managements tools and services have not always kept pace with the growth. In particular, challenges may exist in detecting and effectively addressing network-based security attacks (i.e., intrusions). For example, existing approaches typically rely on a quarantine approach once a source of an intrusion is determined and/or rely on tools that may not be designed to be operated by an average user desiring to actively secure resources. In another example, unauthorized activities, such as accessing data and/or resources, within the cloud environment can occur from internal users as well as individuals and/or systems external to the secured networked computing environment.

Embodiments of the present invention also recognize that providing security solutions for computing systems is a standalone discipline and business. Authentication and intrusion detection are two functions provided by a security solution. Various security solutions utilize the topology and connections of a network to protect a computing system and control access to information resources. Security policies, security protocols, and/or security levels may be modified in response to intrusion detection. In some instances, the response to an unauthorized activity (e.g., an intrusion; an action, such as file deletion, that is not permitted to a user, etc.) may be generalized, such as uniformly increasing a security level for a portion of a network. In other instances, an unauthorized activity (e.g., an intrusion) may trigger a targeted response based on the severity of the intrusion and/or a sensitivity of the information resource and/or component that is targeted by the intrusion. In one example, a response to an intrusion that targets a database may be encrypted in response to unauthorized access to the database. In another example, highly sensitive information may include: medical records, social security numbers, trade secrets, undisclosed financial results of a business, etc. Low sensitivity information may include information, such as telephone numbers, mailing addresses, some demographic information, etc., which may be found on commonly accessible sources. The sensitivity of other information, such as criminal records, allergy data, government documents, etc., may vary based on other criteria.

Figure 6:
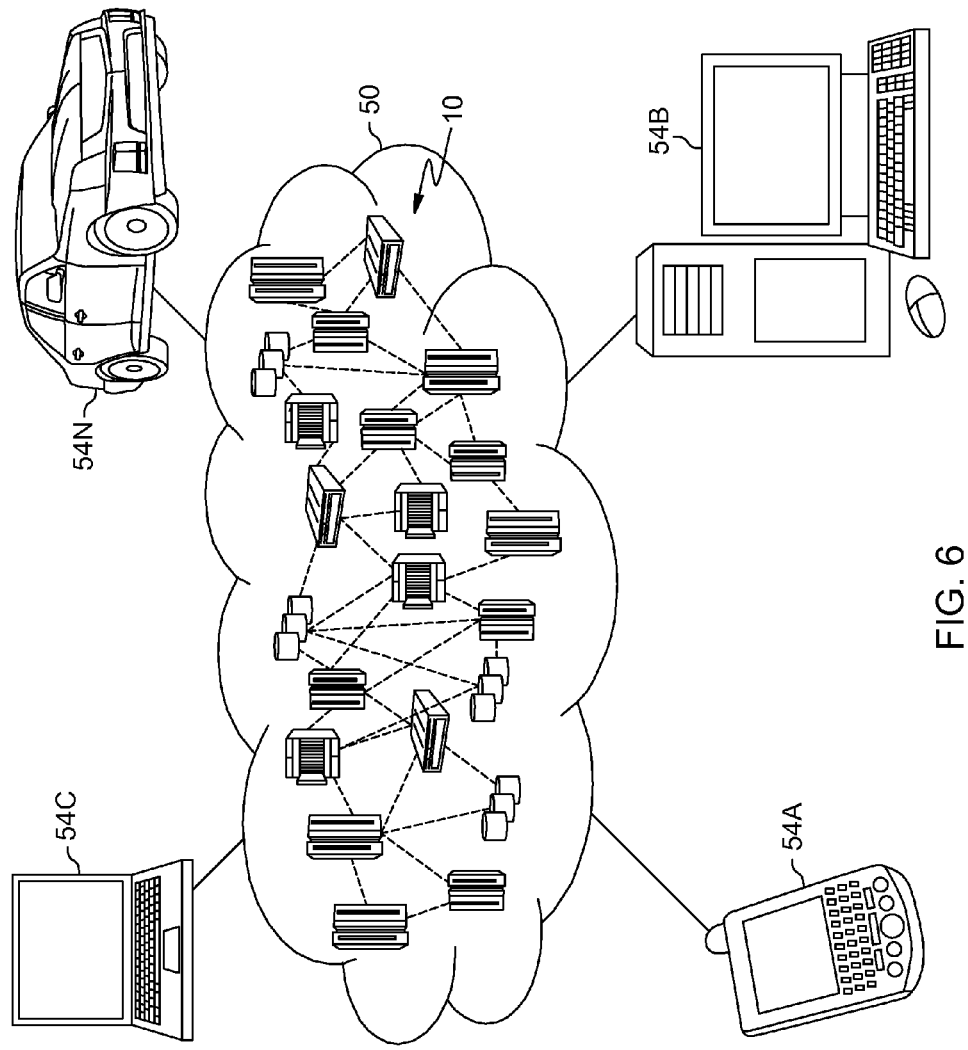
FIG. 6 illustrates a cloud computing environment, in accordance with an embodiment of the present invention.
Figure 7:
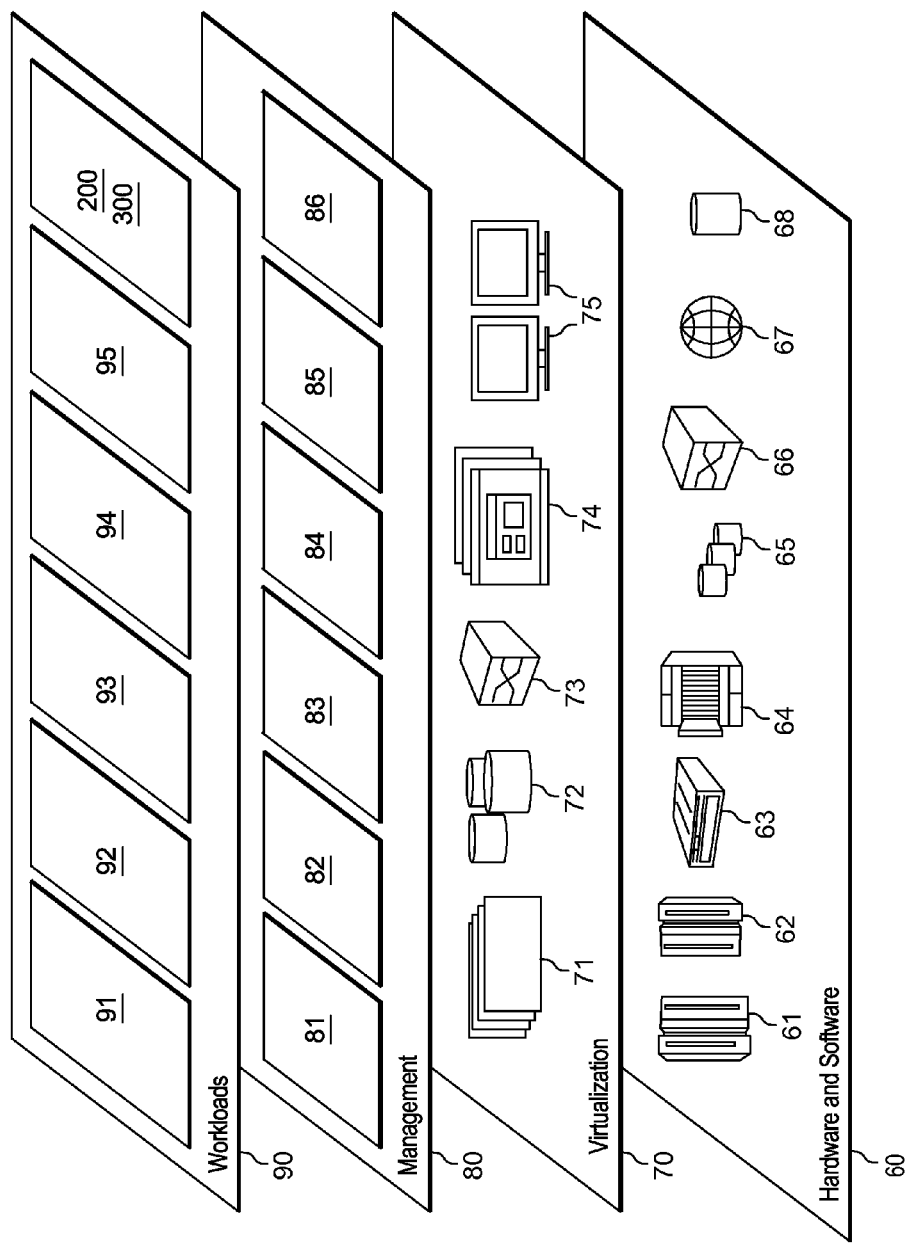
FIG. 7 depicts abstraction model layers, in accordance with an embodiment of the present invention.

Some embodiments of the present invention may be implemented as a system function (e.g., referring to FIG. 7, management layer 80). Other embodiments of the present invention may be implemented on individual nodes and communicated within cloud computing environment 50 (e.g., referring to FIG. 6). Embodiments of the present invention utilize a concept of "brother" nodes as opposed to parent and sibling nodes to identify information resources (e.g., databases, files, etc.) and/or computing resources (e.g., servers, network hardware, etc.), herein identified as resources. Identified resources may be grouped within a domain, which includes a resource affected by unauthorized activities, to provide security and monitoring for related resources (e.g., brother nodes).

Embodiments of the present invention utilize relationships between resources to determine which resources (e.g., brother nodes) comprise a group of related resource. A group of related resources herein is identified as a domain. Some embodiments of the present invention utilize discreet relationships to determine a domain. Examples of discreet relationships may include, but are not limited to: a network topology, a business relationship, databases accessed by a query from a website, etc. Other embodiments of the present invention may dynamically define a domain based on relative relationships (e.g., relatedness) of resources.

Various embodiments of the present invention may utilize risk and cost (e.g., resources utilized, reduced response time, a frequency of monitoring, etc.) to modify a scope (e.g., size, included computing resources, etc.) of a domain. Additional embodiments of the present invention further analyze one or more security policies to determine a risk boundary that defines a domain based on the calculated relatedness values. In an example, an embodiment of the present invention utilizes a risk/cost analysis to generate a relatedness risk boundary based on a threshold value and/or a tolerance value. A threshold value is utilized to dictate how closely related resources of a domain are to a resource targeted by one or more unauthorized activities. In some embodiments, a threshold value corresponding to a risk boundary may dynamically change in response to changes in an unauthorized activity. Another embodiment of the present invention modifies which resources are included in a domain by utilizing a risk/cost analysis. In an example, a cost/risk analysis may be define as a matrix.

Various embodiments of the present invention determine reversion criteria for security (e.g., security policy, security level, security actions, etc.) implemented on a resource in response to a reduction and/or cessation of an unauthorized activity. Reversion criteria may dynamically modify the duration, speed, and scope associated with migrating from a higher-level security policy and/or security level to a lower-level security policy and/or security level when unauthorized activity directed to a resource diminishes or ceases.

Embodiments of the present invention may utilize one or more algorithms to generate a decay function that affects the time associated with migrating from a higher-level security policy to a lower-level security policy when unauthorized activity directed to a resource diminishes or ceases. Conversely, embodiments of the present invention may utilize one or more algorithms to implement a change in a security among resources within a domain. In one example, a dampening algorithm is utilized to delay and/or reduce the extent of an upgrade to security in response to unauthorized activity. In another example, an algorithm that produces a hysteresis curve may increase the initial response to unauthorized activity. A further embodiment of the present invention combines one or more relatedness values and the algorithms utilized by a security policy to generate a more granular response to security policy changes within a domain of related resources.

The descriptions of the various scenarios, instances, and examples related to the present invention have been presented for purposes of illustration but are not intended to be exhaustive or limited to the embodiments disclosed. Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a," "an," and "the" are intended to include the plural forms as well, unless the context clearly indicates otherwise. Furthermore, the use of the terms "a," "an," etc., do not denote a limitation of quantity but rather denote the presence of at least one of the referenced items. The term "set" is intended to mean a quantity of at least one. It will be further understood that the terms "comprises" and/or "comprising," or "includes" and/or "including," when used in this specification, specify the presence of stated features, regions, integers, steps, operations, elements, and/or components but do not preclude the presence or addition of one or more other features, regions, integers, steps, operations, elements, components, and/or groups thereof.

Figure 1:
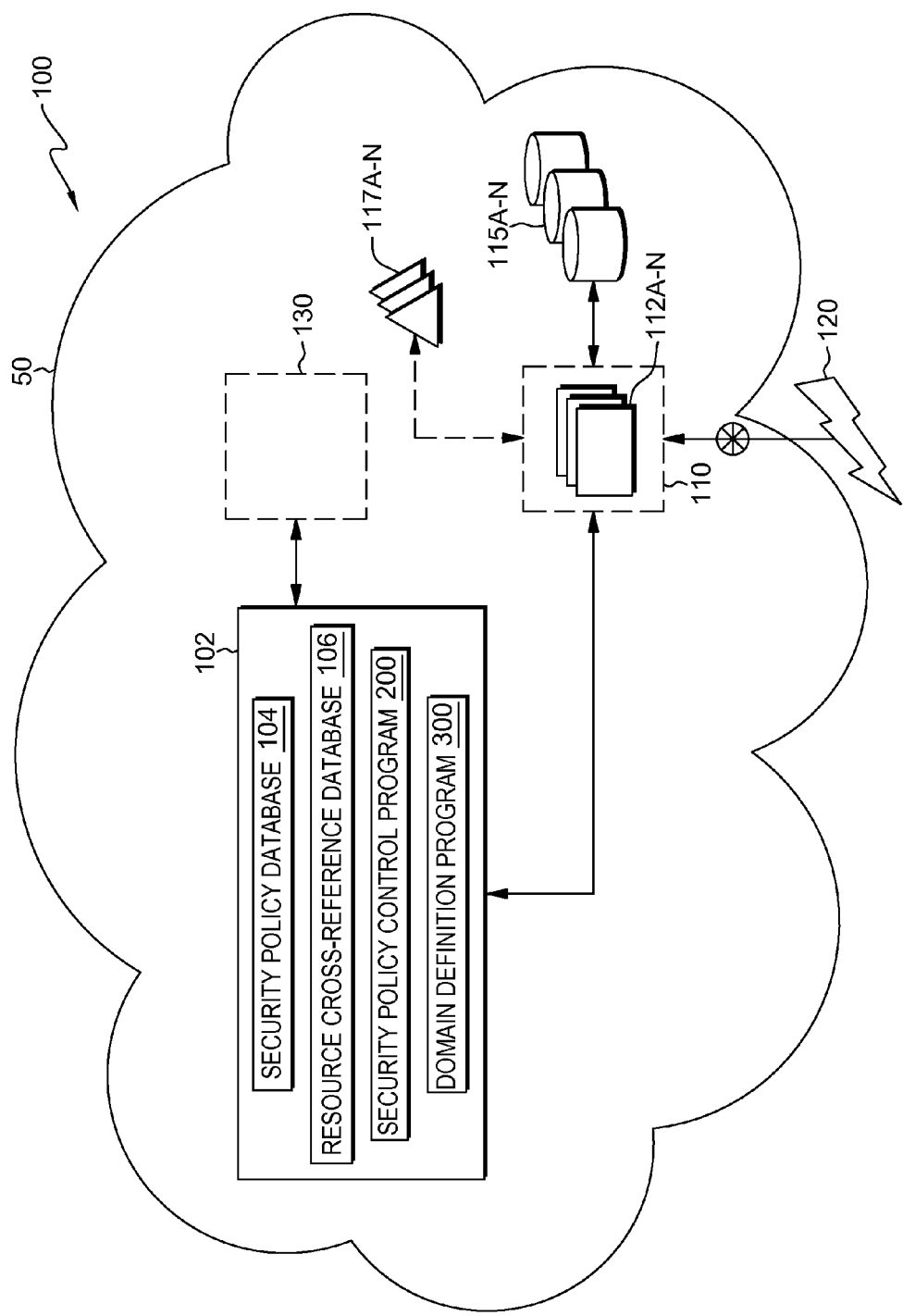
FIG. 1 depicts functional block diagram of a data processing environment, in accordance with an embodiment of the present invention.

The present invention will now be described in detail with reference to the Figures. FIG. 1 is a functional block diagram illustrating a networked computing environment, generally designated as 100 in an embodiment, in accordance with the present invention. FIG. 1 provides only an illustration of one implementation and does not imply any limitations with regard to the environments in which different embodiments may be implemented, such as cloud computing environment 50 (FIG. 6). Many modifications to the depicted environment may be made by those skilled in the art without departing from the scope of the invention as recited by the claims.

An embodiment of networked computing environment 100 includes: computer system/server 102, domain 110, hardware 112A-N, storages 115A-N, security policies 117A-N, unauthorized activity 120, and domain 130. In one embodiment, computer system/server 102, domain 110, hardware 112A-N, storages 115A-N, unauthorized activity 120, and domain 130 communicate utilizing network communications. Network communications can be, for example, a local area network (LAN), a telecommunications network, a wide area network (WAN), such as the Internet, or any combination of the three, and include wired, wireless, or fiber optic connections. In general, network communications can be any combination of connections and protocols that will support communications between computer system/server 102, domain 110, hardware 112A-N, storage 115A-N, unauthorized activity 120, and domain 130, in accordance with embodiments of the present invention.

Computing system/server 102 includes: security policy database 104, resource cross-reference database 106, security policy control program 200, domain definition program 300, and various programs and data (not shown).

In example embodiments, computer system/server 102 can be a desktop computer, a computer server, or any other computer systems known in the art. In certain embodiments, computer system/server 102 represents computer systems utilizing clustered computers and components (e.g., database server computers, application server computers, etc.) that act as a single pool of seamless resources when accessed by elements of networked computing environment 100 (e.g., domain 130). In general, computer system/server 102 is representative of any electronic device or combination of electronic devices capable of executing computer readable program instructions. Computer system/server 102 may include components, as depicted and described in further detail with respect to FIG. 6, in accordance with embodiments of the present invention. Computer system/server 102, can be implemented as either a stand-alone computer system (e.g., a node 10) or as a networked computer system as shown in FIG. 6. In another embodiment, computer system/server 102, and associated programs and data, may be included in security 86 (referring to FIG. 7). In yet another embodiment, computer system/server 102, and associated programs and data, may be included in workload layer 90 (referring to FIG. 7).

Security policy database 104 includes a plurality of security policies. In an embodiment, a security policy may include various security levels. An instance of a security level may include a plurality of security responses based on attributes (e.g., frequency of an intrusion attempt, sensitivity of targeted resource, etc.) corresponding to an unauthorized activity. Security responses may include but are not limited to: encrypting data, modifying authentication protocols, modifying firewall settings, initiating ant-virus scans, varying polling rates, etc. In some embodiments, security policy database 104 is part of a system function within a cloud computing environment, referring to FIG. 7, such as security 86 of management layer 80. In other embodiments, security policy database 104 includes one or more security policies (e.g., security policy 117A) corresponding to a resource (e.g., hardware 112A). In various embodiments, security policy database 104 includes the security policies related to one or more resources of a domain. In addition, security policy database 104 may include one or more rules in which the security policy dictates a precedence in response to two or more domains sharing resources.

In one embodiment, security policy database 104 includes a rule that dictates one or more security responses to an unauthorized activity that affects a shared resource. In another embodiment, security policy database 104 includes a rule that dictates one or more security responses to an unauthorized activity within a domain that interacts with another domain. Similarly in various embodiments, security policy database 104 includes rules that dictate which reversion criteria is utilized in response to a cessation of an unauthorized activity. For example, security policy database 104 may include rules that apply a time element as a reversion criteria, such as a one minute delay when reverting from SL2 to SL1; however, there is a five minute delay when reverting from SL3 to SL2.

Resource cross-reference database 106 includes information pertaining to which resources comprise a domain. In one embodiment, resource cross-reference database 106 includes predefined domains (e.g., groupings). In one example, domain 130 is defined with respect to a network configuration, such as Internet protocol address (IP address) that range from 190.25.234.1 to 190.25.234.23. In another example, domain 130 is defined with respect to information (e.g., databases, image files, etc.) that is utilized by a website. In another embodiment, resource cross-reference database 106 includes domains based on provisioned system resources, such as, but not limited to a logical partition (LPAR) and a VM.

In an alternative embodiment, resource cross-reference database 106 comprises resources identified by relative relatedness. In some embodiments, resource cross-reference database 106 may be comprised of domains defined by various embodiments. One embodiment of the present invention may utilize an algorithm to determine a relatedness value (e.g., ratio). An example embodiment may utilize the following algorithm to determine relatedness values:

$$RelatednessRatio = \left(\sum Object\_Search \times Life\_Cycle\_1\right) + \left(\sum \frac{Keep\_Time}{Time\_Weight} \times Life\_Cycle\_2\right) + \left(\sum Select\_Times \times Action\_Ratio \times Life\_Cycle\_3\right)$$

The following is an explanation for the factors and/or variables included in the above equation. Some factors may be updated (e.g., optimized) on a periodic basis based on analytics and/or machine learning applied to detected unauthorized activities (e.g., security threats), effectiveness of security responses among related resources, and/or cost of implementing one or more security protocols (e.g., responses). In an example embodiment, a RelatednessRatio is a calculated value for the relative relatedness of resources (e.g., brother nodes). Various factors are combined (e.g., summed) because some variables, such as Object_Search may have corresponding (e.g., specific) values for other variables, such as Time_Weight. Object_Search is one or more resources (e.g., servers, data files, etc.) affected by an unauthorized activity. Values corresponding to variables Life_Cycle_1, Life_Cycle_2, and Life_Cycle_3 may be obtained from one or more other algorithms.

Figure 4A:
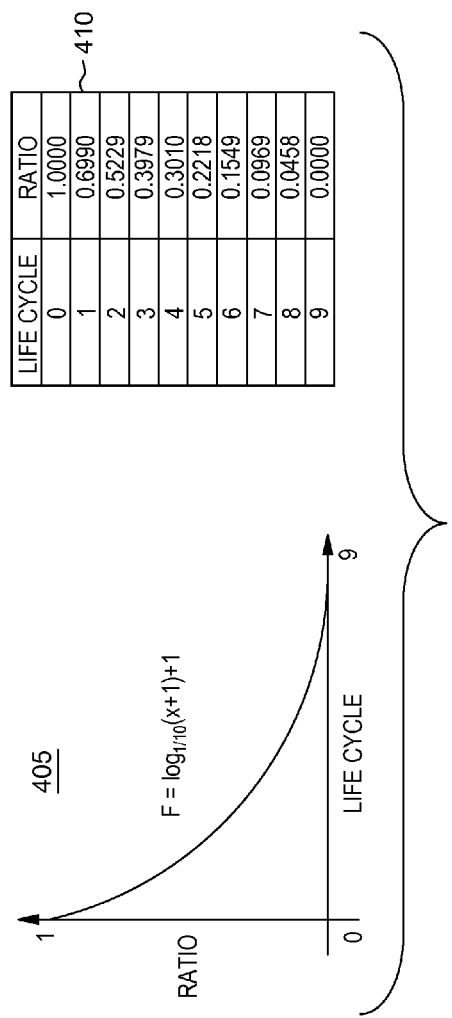
FIG. 4a depicts an example of an algorithm utilized, in accordance with an embodiment of the present invention.

Referring to FIG. 4a, an example algorithm for determining the values for a Life_Cycle ratio is depicted in graph 405. In an embodiment, a Life_Cycle ratio value may be a decay factor (e.g., reversion factor), such as the ratio values in table 410. In an embodiment, variables Life_Cycle_1, Life_Cycle_2, and Life_Cycle_3 may be based on different criteria and a corresponding Life Cycle may be determined by a lookup table for example. In an example, a sensitive resource (e.g., object) may have a Life_Cycle of zero with a corresponding Ratio of 1.0000. In an instance, Keep_Time is a period of time (e.g., duration) related to an unauthorized activity affecting an Object_Search. Time_Weight is a value that can increase or decrease an effect (e.g., response sensitivity) associated with a Keep_Weight.

In an instance, Select_Times corresponds to a frequency of interactions between a computing node (e.g., a resource) targeted by an unauthorized activity and a brother node (e.g., a resource that communicates with the affected node). Action_Ratio is a factor indicting the level of relatedness between one or more groups, levels, and/or distances of nodes (e.g., resources). In an instance, Action_Ratio dampens the response (e.g., reduces the relatedness) of "distant" nodes. A node "distance" may be defined relative to the interaction level with the affected node. In one example, an "adjacent" node directly communicates with an affected node. An "adjacent" node may have an Action_Ratio=1.0. In another example, a "near" node does not interact directly with an affected node; the near node communicates data to an adjacent node. A "near" node may have an Action_Ratio=0.6. In another example, a "far" node may be two or more levels of interaction distant from the affected node, such as a "far" node⇔"near" node⇔"adjacent" node⇔affected (e.g., targeted) node. A "far" node may have an Action_Ratio=0.2.

In an embodiment, domain 110 includes hardware 112A-N (e.g., computing resources), which are brother nodes based on one or more relatedness analysis. Hardware 112A-N, of domain 110 interfaces with (e.g., sends and/or receives data, controls, monitors, etc.) storage 115A-N. In an embodiment, the resources comprising domain 110 are affected by security policies 117A-N. In some embodiments, one or more securities policies of security policies 117A-N may be implemented on one or more storage 115A-N based on corresponding relationships with hardware 115A-N.

In one embodiment, domain 130 may include (e.g., share) the one or more resources of domain 110. In some embodiments, domain 130 is comprised of other resources (e.g., brother nodes) of cloud computing environment 50 based on another relatedness analysis. In an alternative embodiment, domain 130 is comprised of one or more resources (e.g., brother nodes) external to cloud computing environment 50 and may be accessed via one or more network connections (not shown).

Security policy control program 200 determines a domain of resources that are related to a resource that is affected (e.g., targeted) by an unauthorized activity. In one embodiment, security policy control program 200 obtains pre-defined domain (e.g., grouping) information (e.g., a list of resources comprising a domain) from resource cross-reference database 106. In another embodiment, security policy control program 200 interfaces with domain definition program 300, and in response to information provided by security policy control program 200, domain definition program 300 generates one or more domains associated with a targeted resource and related securitized policies.

In various embodiments, security policy control program 200 may dynamically respond to changes in an unauthorized activity that targets a resource. In one scenario, security policy control program 200 may select another one or more security policies for implementation within a domain. In another scenario, security policy control program 200 may increase the scope (e.g., size of a domain). In various scenarios, security policy control program 200 determines that a threat posed by an unauthorized activity decreases and/or ceases, and security policy control program 200 initiates a reversion of one or more security policies implemented within a domain. In some embodiment, security policy control program 200 may include risk and cost when determining a domain and/or security policy responses.

Domain definition program 300 determines one or more domains associated with a resource affected (e.g., targeted) by an unauthorized activity. In one embodiment, domain definition program 300 utilizes risk boundaries to determine the one or more domains associated with a resource affected (e.g., targeted) by an unauthorized activity. Domain definition program 300 may utilize risk boundaries to define a domain based on: security policies, a threat level of the unauthorized activity, the sensitivity of the targeted resource (e.g., information) and/or as a tolerance applied to calculated relatedness values of resources. In some embodiments, domain definition program 300 determines that the scope (e.g., size) of a domain may vary in response to a threat level associated with an unauthorized activity.

In another embodiment, domain definition program 300 determines whether one or more domains interact (e.g., share one or more common resources). In addition, domain definition program 300 may determine which one or more security policies to implement for domains that interact. In another embodiment, domain definition program 300 determines a cost for implementing a security policy. In various embodiments, domain definition program 300 includes one or more reversion criterion with the implemented one or more security policies. Domain definition program 300 utilizes reversion criteria to modify an implemented security policy in response to a reduction or elimination of the threat of an unauthorized activity.

Figure 2:
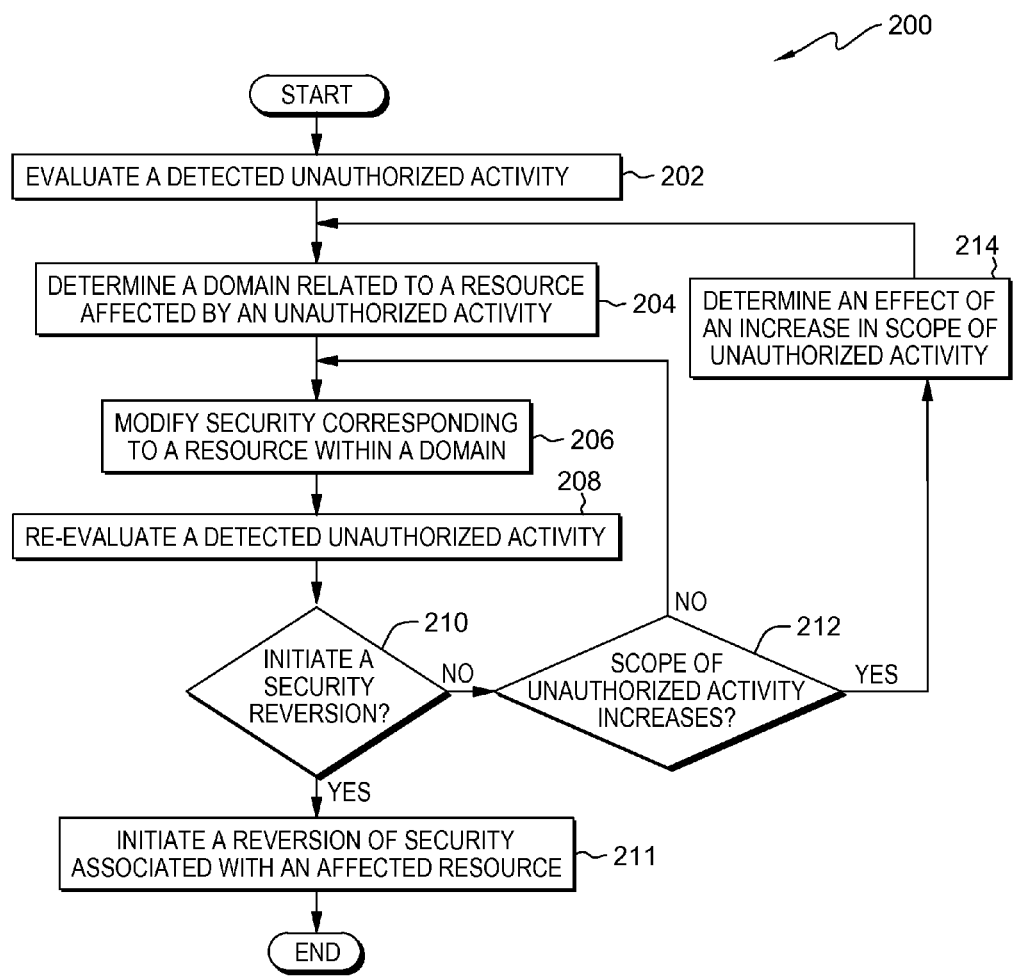
FIG. 2 depicts a flowchart of the operational steps of a security policy control program, in accordance with an embodiment of the present invention.

FIG. 2 is a flowchart depicting operational steps for security policy control program 200, a program for identifying a domain of related resources that includes a resource affected by an unauthorized activity and a resultant modification of security applied to one or more resources within the domain, in accordance with embodiments of the present invention. In addition, security policy control program 200 determines a reversion period for resources that are affected by a security modification.

In step 202, security policy control program 200 evaluates a detected unauthorized activity. An unauthorized activity includes but is not limited to: file actions, such as insufficient permissions to alter, copy, replace, and/or delete a file; network actions, such as port scanning, multiple failed authentication attempts, and/or statistically anomalous activities; and abnormal system activity, such as decreased responsiveness, system resource crash, and new users. In one embodiment, security policy control program 200 evaluates information received from security 86 (referring to FIG. 7, management layer 80), related to an intrusion, such as unauthorized activity 120. In another embodiment, security policy control program 200 evaluates information received from another security program (not shown) that is monitoring a computing system (e.g., a server) that includes a resource that is affected by an unauthorized activity.

In an alternative embodiment, security policy control program 200 detects an unauthorized activity to a resource based on security software on the resource. In some embodiments, security policy control program 200 determines the type of resource (e.g., hardware, software, data files, graphic files, etc.) that is subjected to an unauthorized activity. In an example, security policy control program 200 determines that the unauthorized activity is an access attempt (referring to FIG. 1, unauthorized activity 120) directed toward a hardware element, such as hardware 112A (e.g., a server) within cloud computing environment 50. In another example, security policy control program 200 determines that an unauthorized activity is an attempt to access a data resource (e.g., a file, a database, etc.) stored within cloud computing environment 50 (e.g., storage 115B).

In one embodiment, security policy control program 200 also evaluates an unauthorized activity to determine a severity and a scope. In one example scenario, security policy control program 200 determines that unauthorized activity 120 is not a threat based on an activity being short-lived and the activity is associated with a source (e.g., a group of users) that can access (e.g., read, copy) a data resource but cannot modify and/or delete the data resource (e.g., a limited threat to data integrity). In another example, security policy control program 200 may determine that unauthorized activity 120 is a low-level threat because the activity originates within a domain in response to a user of hardware 112C attempting to access storage 115F controlled by hardware 112F. In another example, security policy control program 200 determines that unauthorized activity 120 is a persistent, unauthorized activity targeting multiple data resources (e.g., on storage 115B, 115G, 115H) within cloud computing environment 50.

In step 204, security policy control program 200 determines a domain related to a resource affected by an unauthorized activity. In one embodiment, security policy control program 200 determines a domain related to a resource affected by an unauthorized activity based on information within resource cross-reference database 106. In one scenario, security policy control program 200 determines from resource cross-reference database 106 that an affected resource is a portion of a business relationship. With respect to an embodiment of the current invention, a business relationship identifies interrelated shared resources that are accessed by one or more internal functional areas of a business and/or one or more external businesses. In one example, security policy control program 200 determines that the affected resource is related to internal business relationships (e.g., operations); therefore, domain 110 may include resources, such as manufacturing, finance, human resources, sales and distribution, etc. In another example, security policy control program 200 determines that the affected resource is related to external business relationships; therefore, domain 110 may include gateway servers of: suppliers, advertising agencies, financial institutions, etc. In another scenario, security policy control program 200 determines from resource cross-reference database 106 that an affected resource is a portion of a health-care relationship, such as gateway servers of: pharmacies, hospitals, doctor's offices, imaging services, etc.

Figure 4B:
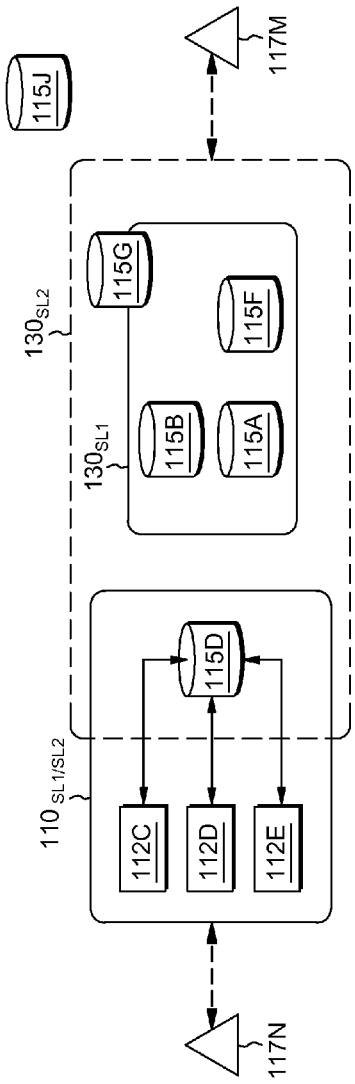
FIG. 4b is an illustrative example of domains comprised of various resources and security levels, in accordance with an embodiment of the present invention.

In another embodiment, security policy control program 200 includes one or more aspects (e.g., severity) of an unauthorized activity, targeting an affected resource, to determine a domain related to the affected resource. In one scenario, security policy control program 200 analyzes an unauthorized activity to determine a scope for a domain. In an example referring to FIG. 4b, security policy control program 200 determines that the unauthorized activity is a SQL query (not shown) directed toward information sources on storages 115A, 115B, 115D, and 115F. In this example, a SAN (not shown) includes storages 115A, 115B, 115D, 115F, 115G, and 115J. However, based on $130_{SL2}$ of security policy 117M, security policy control program 200 determines that domain 130 comprises storages 115A, 115B, 115D, 115F, and 115G. In another scenario, security policy control program 200 may determine that a domain related to an affected resource is based on a shared resource. In an example referring to FIG. 4b, security policy control program 200 determines that various instances of unauthorized activity (not shown) target at least two servers (hardware 112C, 112D) that access a database (e.g., storage 115D). Subsequently, security policy control program 200 determines that domain 110 includes hardware 112C, 112D, and 112E, each of which can access storage 115D.

Referring to step 204, in various embodiments, security policy control program 200 determines that a domain is not defined for a resource affected by an unauthorized activity, and security policy control program 200 executes an instance of domain definition program 300. In some embodiments, security policy control program 200 executes an instance of domain definition program 300 to verify the scope of a domain defined within resource cross-reference database 106, for a resource subject to an unauthorized activity. In an example, security policy control program 200 determines that security policy 117D dictates that a domain associated with storage 115D (e.g., resource cross-reference database 106) be verified periodically, such as at thirty-day time intervals.

In an alternative embodiment, security control program 200 utilizes various factors, such as cost, security level, security policy, relatedness, etc. to determine a domain related to a resource affected by an unauthorized activity. In one example, cost may be monetary value associated with the resources utilized by a security policy in response to an unauthorized activity. In another example, cost may be identified with respect to the effects of a security policy on computing system/server 102, such as reduce response time and constrain network activity. In one scenario, security control program 200 utilizes an algorithm to determine the relatedness of nodes. Subsequently, security control program 200 executes an instance of domain definition program 300 to apply a risk boundary to define a domain. In an example referring to FIG. 4b, security policy control program 200 determines that for security level 1 (SL1), storages 115A, 115B, and 115F are closely related and are included in domain 130. However, security policy control program 200 determines that storage 115G is less closely related to storages 115A, 115B, and 115F; storage 115D and storage 115J are distantly related. Storage 115G may or may not be included in domain $130_{SL1}$ based on one or more factors (e.g., a cost/risk analysis). In a further example, if security policy control program 200 determines that the security level increases to SL2, then security policy control program 200 determines that domain $130_{SL2}$ includes storages 115A, 115B, 115D, 115F, and 115G.

In step 206, security policy control program 200 modifies security corresponding to a resource within a domain. In one embodiment, security policy control program 200 determines that a security policy (e.g., security policy 117F) related to a domain implements security measures, such as protocols, responses, firewalls, etc., uniformly (e.g., to each resource) within a domain. In another embodiment, security policy control program 200 determines that each resource within a domain includes a corresponding security policy. In various embodiments, security policy control program 200 determines which security policy (e.g., security level) is implemented on a resource within a domain based on an evaluation of an unauthorized activity (step 202). In some embodiments, security policy control program 200 modifies security of a resource based on information associated with an unauthorized activity (e.g., threat level). In one example, security policy control program 200 modifies security of a resource targeted by an unauthorized activity by one security level and other resources in a domain are unaffected to reduce the cost of security in response to a low-threat unauthorized activity (e.g., a false alarm). In another example, security policy control program 200 may reduce the cost of security by increasing a security level for more closely related resource within a domain by two levels and less closely (e.g., a risk boundary tolerance) related resources within a domain by one security level.

Figure 3:
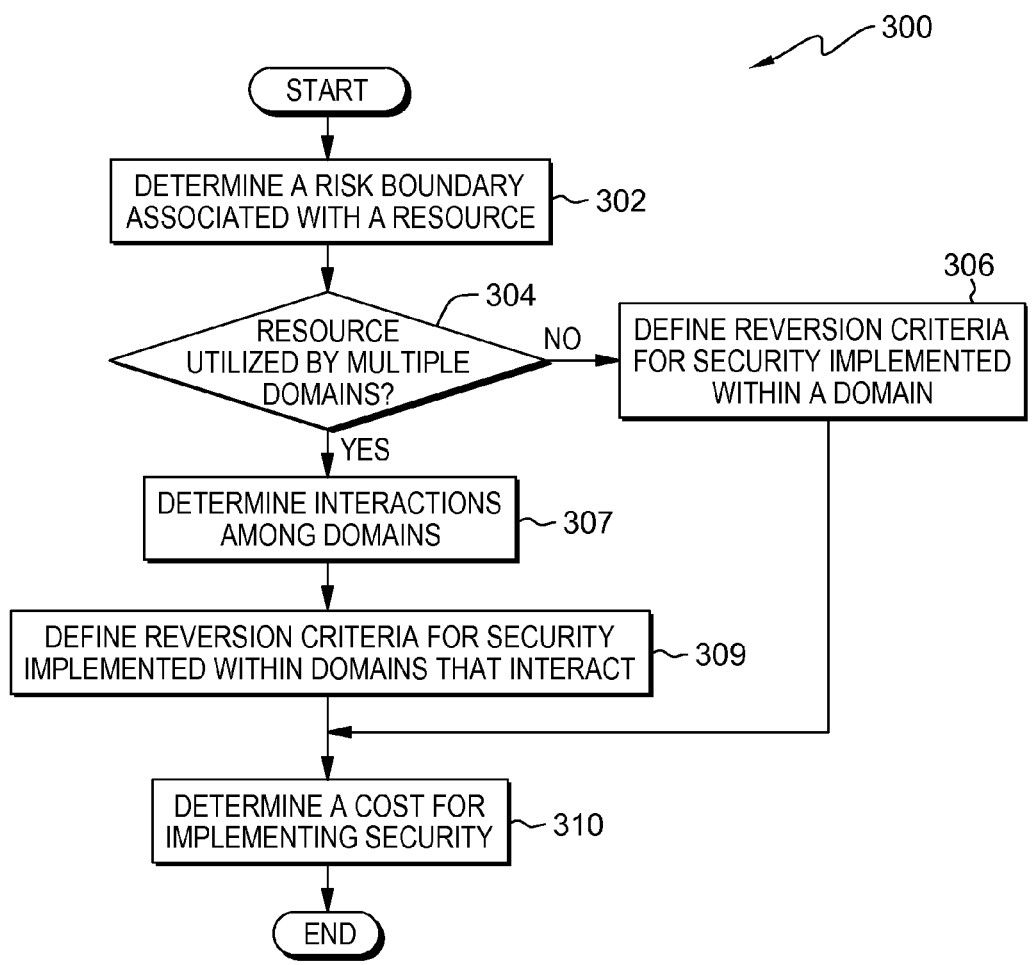
FIG. 3 depicts a flowchart of the operational steps of a domain definition program, in accordance with an embodiment of the present invention.

In further embodiments, security policy control program 200 utilizes information obtained from domain definition program 300 to determine whether domains that utilize a shared (e.g., common) resource interact (referring to FIG. 3, step 307). In an example, referring to FIG. 4b, domain 110 and domain 130 do not interact until domain 130 operates utilizing security level 2 (SL2). Security policy control program 200 determines that domains 110 and 130 share storage 115D until at least domain 130 reverts to SL1. In another embodiment, security policy control program 200 may obtain information from domain definition program 300 indicating domains (e.g., domain 110 and domain 130) that utilized a shared resource (referring to FIG. 4b, storage 115D) interact. Subsequently, security policy control program 200 determines which security measures (e.g., security policies, security levels, etc.) are implemented among interacting domains.

In step 208, security policy control program 200 re-evaluates a detected unauthorized activity. In one embodiment, security policy control program 200 re-evaluates an unauthorized activity (e.g., change in a threat level, frequency of unauthorized activity, etc.) in response to a modification security policy for an affected resource. In another embodiment, security policy control program 200 obtains additional information from security 86 of cloud computing environment 50. In various embodiments, security policy control program 200 re-evaluates an unauthorized activity with respect to the resources within a domain. For example referring to FIG. 1 and FIG. 4b, security policy control program 200 may determine that unauthorized activity 120 shifts access attempts for storage 115D, of domain 110, from hardware 112C to hardware 112E. In some embodiments, security policy control program 200 may determine that an unauthorized activity targeting domain 110 subsequently shifts to targeting domain 130. In other embodiments, security policy control program 200 determines an unauthorized activity ceases.

In an alternative embodiment, security policy control program 200 evaluates information received from another security program (not shown) that monitors a computing system (e.g., a server) that includes a resource that is affected by an unauthorized activity. In an example, security policy control program 200 determines that unauthorized activity 120 targets virtual networking 73 (referring to FIG. 7) to identify another network connection that accesses a targeted resource (e.g., storage 115H).

In decision 210, security policy control program 200 determines whether to initiate a security reversion for a resource affected by an unauthorized activity. In one embodiment, security policy control program 200 determines that an unauthorized activity is a new instance of the unauthorized activity and is not subject to a reversion (e.g., reduction in security level, less restrictive security policy, etc.) of a security policy. In one scenario, security policy control program 200 determines upon re-evaluation (step 208), that an unauthorized activity continues. In another scenario, security policy control program 200 determines upon re-evaluation (step 208) that an unauthorized activity ceases, but one or more reversion criteria, such as sufficient time has not yet elapsed, one or more events has not occurred, to enable a reversion of security (e.g., a security level, a security protocol, a security policy, a security response, etc.). In various embodiments, security policy control program 200 determines that two domains interact via one or more resources that are shared.

Security policy control program 200 may determine that a security policy constrains one or more resources from reverting to a lower security level until each domain that utilizes a shared resource is capable of reverting to a lower security level. In an example, referring to FIG. 4b, security policy 117M dictates that domain 130 maintain SL2 until security policy 117N enables domain 110 to revert from SL2 to SL1 based on the shared resource of storage 115D. In another example, referring to FIG. 4b, security policy 117N permits security policy control program 200 to individually revert resources within domain 110 (e.g., hardware 112C, 112D, 112E and storage 115D) based on the threat level of an unauthorized activity. If storage 115D reverts to SL1 prior to hardware 112C, 112D, and/or 112E reverting to SL1; then security policy control program 200 enables domain 130 to revert from SL2 to SL1 in response to security policy 117M determining that reversion criteria occur.

In decision step 210, responsive to determining not to initiate a security reversion (No branch, decision step 210), security policy control program 200 determines whether a scope of an unauthorized activity increases (decision step 212).

In decision step 212, security policy control program 200 determines whether a scope of an authorized activity increased. In one embodiment, security policy control program 200 determines that a scope of an unauthorized activity has increased by comparing the detected unauthorized activity that is re-evaluated in step 208 to an unauthorized activity detected in step 202. In another embodiment, security policy control program 200 determines that a scope of an unauthorized activity increases based on information obtained from security 86 of management layer 80 of a cloud computing environment. In various embodiments, security policy control program 200 may determine that a scope of an unauthorized activity increases based on subsequent increases of security policies and/or security levels for one or more resources within a domain affected by the unauthorized activity.

In an alternative embodiment, security policy control program 200 may determine that a scope of an unauthorized activity does not increase. In one scenario, security policy control program 200 determines that the frequency of an unauthorized activity decreases as opposed to the scope (e.g., number of resources targeted) decreasing. In another scenario, security policy control program 200 determines that an unauthorized activity ceases. However, security policy control program 200 determines that insufficient time has elapsed (e.g., a reversion criterion) to initiate a security reversion for one or more resources. If security policy control program 200 determines that a scope of an unauthorized activity does not increase (No branch, decision step 212), then security policy control program 200 loops to step 206. In some embodiments, security policy control program 200 delays looping to step 206 for a period dictated by a security policy and/or a life cycle decay algorithm. In other embodiments, security policy control program 200 loops to step 206 without applying a delay.

Referring to decision step 212, responsive to determining that a scope of an unauthorized activity increases (Yes branch, decision step 212), security policy control program 200 determines an effect of an increase in scope of an unauthorized activity (step 214).

In step 214, security policy control program 200 determines an effect of an increase in scope of an unauthorized activity. In one embodiment, security policy control program 200 may determine that the effect of an unauthorized activity (e.g., unauthorized activity 120) is an increase in the frequency of the attempts to access a resource. In another embodiment, security policy control program 200 determines that the effect of an unauthorized activity is to target one or more resources that are more sensitive (e.g., higher risk rank). In various embodiments, security policy control program 200 may determine, based in information provided by security 86 of management layer 80 of a cloud computing environment, that an effect of an increase in scope of an unauthorized activity is identifying one or more deficiencies in a security policy (e.g., security level) implemented to a resource. Subsequently, security policy control program 200 loops to step 204 to determine whether the increase in scope of an unauthorized activity affects a domain (e.g., increases the resources included in a domain) that includes one or more resources affected by an unauthorized activity.

Referring to decision step 210, responsive determining to initiate a security reversion on resource of a domain (Yes branch, decision step 210), security policy control program 200 initiates a reversion of a security associated with an affected resource (step 211).

In step 211, security policy control program 200 initiates a reversion of a security associated with an affected resource. In an embodiment, a reversion (e.g., downgrade) of security is changing a security policy, security protocol, security level, and/or security activities (e.g., actions, responses, monitoring, etc.) from a more secure and/or restrictive security solution to a security solution of reduced security and/or restrictiveness. In one embodiment, security policy control program 200 initiates a reversion of a security associated with resource affected by an unauthorized activity. In one scenario, security policy control program 200 initiates a reversion of security based on a risk/cost analysis.

In an example, security policy control program 200 determines that an unauthorized activity ceases on a targeted resource and no subsequent unauthorized activities target other resources within the domain. In this example, the targeted resource may revert one security level and other resources within a domain that includes the targeted resource may revert two security levels. In another embodiment, security policy control program 200 determines that a security policy utilizes a delay prior to reverting a security level. In various embodiments, security policy control program 200 resets or cancels a reversion of security in response to information related to a change in security, such as another resource in a domain is targeted by an unauthorized activity, and/or unauthorized activity affects a related (e.g., interacting) domain.

FIG. 3 is a flowchart depicting operational steps for domain definition program 300, a program for determining which related resource comprise a domain based on a risk boundary associated with a security policy. Domain definition program 300 also defines criteria that are utilized by a security policy within a domain to determine a reversion period for resources that are affected by a security policy modification, in accordance with embodiments of the present invention. In addition, domain definition program 300 determines a cost for implementing a security policy.

In step 302, domain definition program 300 determines a risk boundary for a security policy associated with a resource. Domain definition program 300 utilizes a risk boundary for a security policy that is associated with a resource to determine which other resources (e.g., brother nodes) are related to the resource, in which related resources may be defined as a domain. In one embodiment, domain definition program 300 stores the resources that comprise a domain in resource cross-reference database 106. In another embodiment, domain definition program 300 utilizes an analytics application (not shown) to further analyze the security policies associated with the resources that comprise a domain to determine whether to modify a domain (e.g., include additional resources, exclude one or more resources). In an example referring to FIG. 4b, domain definition program 300 analyzes security policy 117M and determines that storage 115J is excluded from domain 130 for SL1 and SL2. Modification to a domain may include adding one or more resources to a domain and/or removing one or more resources from the domain. Domain definition program 300 stores the modified domain in resource cross-reference database 106.

In one embodiment, domain definition program 300 defines a risk boundary (e.g., a domain) of a security policy of a resource with respect to a business relationship. In one example, domain definition program 300 may determine that a domain based on an internal business relationship (e.g., operations) includes resources, such as manufacturing, finance, human resources, sales and distribution, etc., and the corresponding systems (e.g., servers) that include the resource. In another embodiment, domain definition program 300 defines a risk boundary of a security policy of a resource with respect to a network topology that can access the resource. In another embodiment, domain definition program 300 defines a risk boundary of a security policy of a resource with respect to a middleware program that processes the resource. In various embodiments, domain definition program 300 determines a risk boundary of a security policy of a resource with respect to users and/or systems that utilize the resource. In an example, domain definition program 300 may define a domain within a medical environment to include pharmacies, hospitals, offices of doctors, imaging services, etc. In another example, domain definition program 300 may determine a risk boundary with respect to provisioned systems within a cloud computing environment, such as tenant applications within a VM and/or VMs within a LPAR.

Referring to step 302 in some embodiments, domain definition program 300 may define a domain that includes resources (e.g., brother nodes) based on a security level corresponding to a security policy. In one scenario, domain definition program 300 may define a new domain, based on network topology that corresponds to a higher-level security policy. In an example, a new domain includes sibling nodes of the brother nodes that comprise a domain of a lower-level security policy. In another scenario, domain definition program 300 may define (e.g., expand the scope) another domain that includes additional resources that are affected by a resource within a higher-level security policy defined domain. In an example, domain definition program 300 may define the new domain to include additional storage devices accessible by a server, which were not included in the domain of the lower-level security policy that included the server. In other embodiments, domain definition program 300 may determine that multiple risk boundaries (e.g., domains) exist in response to more than one user utilizing a resource. In an example, domain definition program 300 determines that a SAN (e.g., referring to FIG. 4b, storage 115D) is utilized by at least domain 110 and domain 130. In an alternate embodiment, domain definition program 300 dynamically determines a risk boundary and associated domain (e.g., resources) based on information associated with unauthorized activity 120, and one or more risk/cost analysis calculations.

In an alternative embodiment, domain definition program 300 utilizes one or more algorithms to determine a relatedness value for a plurality of resources within a networked computing environment. In one scenario, domain definition program 300 determines relatedness values for resources based on a targeted resource. In an example, a targeted resource has a relatedness value of 1.0, and risk/cost analysis generates a risk boundary with a threshold value of 0.25. Therefore, resources with relatedness values between 0.75 and 1.0 are in the group (i.e., domain) of related resources. Resources with a relatedness value less than 0.75 are excluded from the domain at the current threat level. In an embodiment, domain definition program 300 determines that the scope of a domain may vary based on constraints of a cost/risk analysis. In one scenario, domain definition program 300 determines that cost is a constraint and reduce the scope (e.g., number of included resources) of a domain based on subtracting a tolerance bias associated with a risk boundary from relatedness values of resources included in a security policy. In one scenario, domain definition program 300 determines that cost is a constraint reduced risk constraint and domain definition program 300 adds a tolerance bias associated with a risk boundary from relatedness values of resources included in a security policy.

In decision step 304, domain definition program 300 determines whether a resource is utilized by multiple domains. In one embodiment, decision step 304 determines that a resource is utilized by multiple domains by querying resource cross-reference database 106. In another embodiment, domain definition program 300 determines that a resource is utilized by multiple domains based on one or more security policies within security policy database 104. In some embodiments, domain definition program 300 determines that in response to applying a higher-level security policy, one or more resources are shared by multiple domains. Responsive to determining that a resource is not utilized by multiple domains (No branch, decision step 304), domain definition program 300 defines reversion criteria for security utilized within a domain (step 306).

In step 306, domain definition program 300 defines reversion criteria for security utilized within a domain. In an embodiment, a reversion (e.g., downgrade) of security includes changing a security policy, security protocol, security level, and/or security activities (e.g., actions, responses, monitoring, etc.) from a more secure and/or restrictive security solution to a security solution of reduced security and/or restrictiveness. In one embodiment, domain definition program 300 defines a reversion criterion based on information related to an unauthorized activity (e.g., mode of an intrusion, frequency of an unauthorized activity, etc.). In an example, domain definition program 300 may define one set of reversion criteria for a resource targeted by unauthorized activity 120 in response to determining that unauthorized activity 120 is a denial-of-services attack and another set of reversion criteria for a resource targeted by a password-cracking attack. Domain definition program 300 may utilize one or more events as reversion criteria, such as determining an IP address that is a source of an unauthorized activity and subsequently, computing system/server 102 modifies one or more firewall settings to block the IP address corresponding to the unauthorized activity.

In another embodiment, domain definition program 300 defines reversion criteria based on a scope of an unauthorized activity within a domain and resources targeted by the unauthorized activity. In some embodiments, domain definition program 300 utilizes one or more algorithms to determine reversion criteria for a domain. In an example, referring to FIG. 4a, domain definition program 300 may determine a time-based reversion criterion based on a life cycle value that is based on the sensitivity of a resource. In other embodiments, domain definition program 300 determines one or more reversion criteria for resources of a domain based on a risk/cost analysis. In various embodiments, domain definition program 300 determines reversion criteria for each resource within a domain.

Referring to decision step 304, responsive to determining that a resource is utilized by multiple domains (Yes branch, decision step 304), domain definition program 300 determines interactions among domains (step 307).

In step 307, domain definition program 300 determines the interactions among domains. In one embodiment, domain definition program 300 determines that the interaction among domains that utilize one or more common (e.g., shared) resources is independent of a security policy (e.g., security level) associated with one or more domains. In an example, referring to FIG. 4b, domain definition program 300 may determine that if storage 115D is accessed via domain $130_{SL2}$, then storage 115D is affected by SL2 of security policy 117M. However, if storage 115D is accessed via domain $110_{SL1}$, then storage 115D is affected by SL1 of security policy 117N. In another embodiment, domain definition program 300 determines that the interacting domains utilize one or more common (e.g., shared) resources. Domain definition program 300 selects a more stringent security policy (e.g., security level) from the security policies utilized by each of one or more interacting domains and/or resources. In various embodiments, domain definition program 300 may determine that shared resources a subject a combination of security policies, a security policy of each domain that includes the shared resource. In another example, referring to FIG. 4b, domain definition program 300 determines that storage 115D is affected by both security policy 117M (e.g., encrypt storage 115D) and security policy 117N (e.g., access to storage 115D uses two factor authentication).

In some embodiments, domain definition program 300 determines each resource within a domain may have a corresponding security policy as opposed to a security policy that is implemented among the resources of a domain. In other embodiments, domain definition program 300 may determine that each resource may implement a corresponding security level of a security policy based on information (e.g., threat level) associated with an unauthorized activity.

In step 309, domain definition program 300 defines reversion criteria for a security policy utilized within domains that interact. In one embodiment, domain definition program 300 defines reversion criteria for domains that interact based on information related to an unauthorized activity (e.g., mode of an intrusion, frequency of an unauthorized activity, etc.). In another embodiment, domain definition program 300 defines reversion criteria based on a scope of an unauthorized activity within a domain and resources targeted by the unauthorized activity. In some embodiments, domain definition program 300 utilizes one or more algorithms to determine reversion criteria for a domain. In an example, referring to FIG. 4a, domain definition program 300 may determine a time-based reversion criterion based on a life cycle value that is based on the sensitivity of a resource. In other embodiments, domain definition program 300 determines one or more reversion criteria for resources of a domain based on a risk/cost analysis. In various embodiments, domain definition program 300 determines reversion criteria for each resource within a domain.

In various embodiments, domain definition program 300 utilizes a hierarchy of criteria to determine a reversion of security within domains that interact. In an example, referring to step 307, domain definition program 300 may utilize the determined interactions among domains to define a hierarchy of criteria utilized for a reversion of security. In another example, domain definition program 300 may utilize information within security policies to determine a hierarchy of criteria to determine a reversion of security. In another embodiment, domain definition program 300 may include calculated relatedness values within a hierarchy of criteria to determine a reversion of security within domains that interact. In an example, referring to FIG. 4b, domain definition program 300 may determine that within domain 130 that storage 115D is less closely related to storage 115A than storage 115G. Therefore, when security policy control program 200 determines that security policy 117M may revert from SL2 to SL1, storage 115G reverts prior to storage 115D.

In step 310, domain definition program 300 determines a cost for implementing a security policy. In an embodiment, domain definition program 300 determines a cost of a security policy (e.g., security level) with respect to computing system/server 102, such as diverting resource from operations to security, increased response time for executing applications, increased frequency of monitoring, degradation of system performance, increasing encryption levels (e.g., 64 bit, 128 bit, 256 bit), utilizing firewalls, impacts to customer satisfaction, etc.

It is understood in advance that although this disclosure includes a detailed description on cloud computing, implementation of the teachings recited herein are not limited to a cloud computing environment. Rather, embodiments of the present invention are capable of being implemented in conjunction with any other type of networked computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
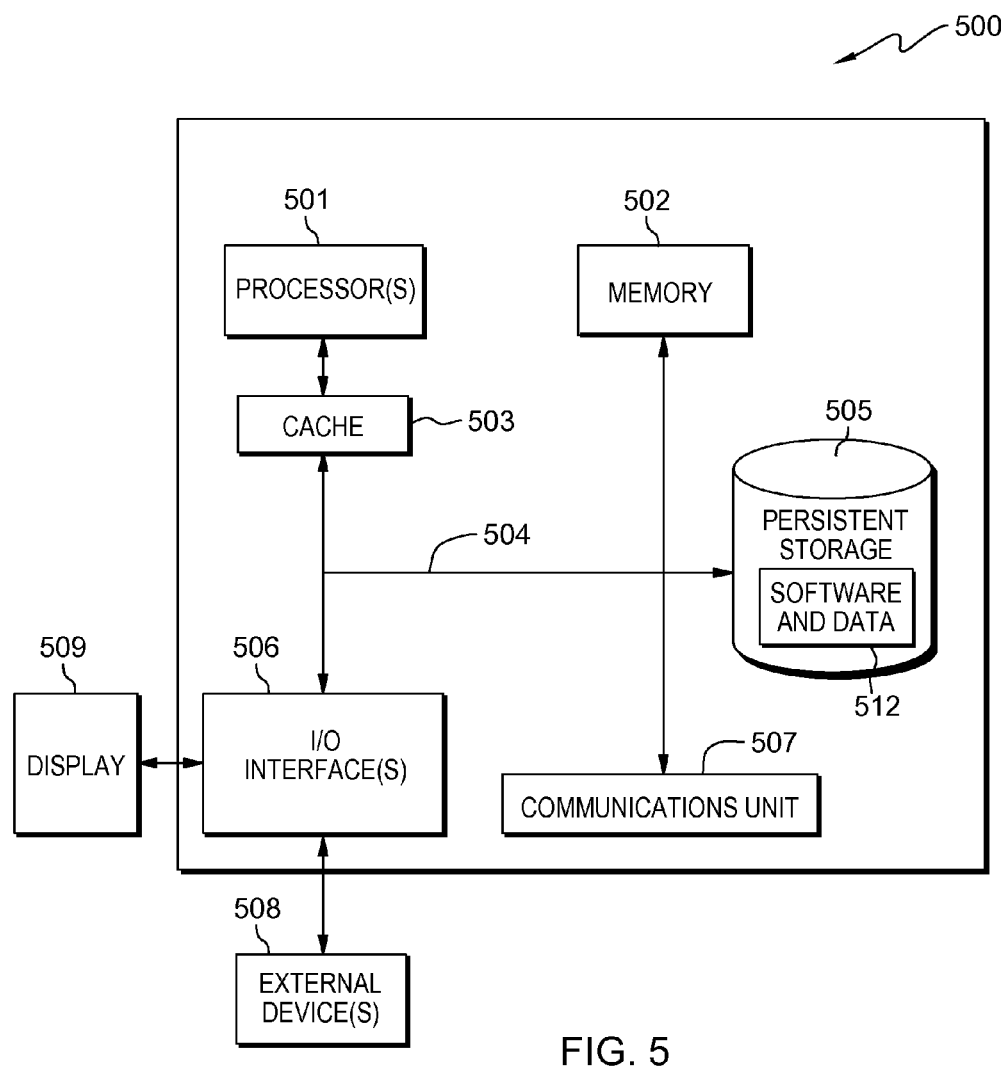
FIG. 5 is a block diagram of components of a computing system/server, in accordance with an embodiment of the present invention.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein.

Regardless, cloud computing node 10 is capable of being implemented and/or performing any of the functionality set forth hereinabove. In example embodiments, cloud computing node 10 is representative of computing system/server 102. In various embodiments, cloud computing node 10 may be representative of hardware 112A-N, wherein hardware 112A-N can be physical instances of hardware elements and/or computing devices (e.g., RISC based servers 62, servers 63, etc.) and/or virtualized instance of hardware elements, computing devices (e.g., virtual servers 71, virtual storage 72, virtual networks 73, etc.).

In cloud computing node 10, there is a computer system/server 102, which is operational with numerous other general purpose or special purpose computing system environments or configurations. Examples of well-known computing systems, environments, and/or configurations that may be suitable for use with computer system/server 102 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 102 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 102 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computing system 500 in cloud computing node 10 is shown in the form of a general purpose computing device, which is representative of computing system/server 102. Computing system 500 is an example of a system that includes software and data 512. Computing system 500 includes processor(s) 501, memory 502, cache 503, persistent storage 505, communications unit 507, I/O interface(s) 506, and communications fabric 504. Communications fabric 504 provides communications between memory 502, cache 503, persistent storage 505, communications unit 507, and I/O interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processor(s) 501 by holding recently accessed data, and data near recently accessed data, from memory 502.

Program instructions and data used to practice embodiments of the present invention may be stored in persistent storage 505 and in memory 502 for execution by one or more of the respective processor(s) 501 via cache 503. In an embodiment, persistent storage 505 includes a magnetic hard disk drive. Alternatively, or in addition to a magnetic hard disk drive, persistent storage 505 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505. Software and data 512 are stored in persistent storage 505 for access and/or execution by one or more of the respective processor(s) 501 via cache 503 and one or more memories of memory 502. With respect to server 102, software and data 512 includes security policy database 104, resource cross-reference database 106, security policy control program 200, domain definition program 300, and various other programs and data (not shown).

Communications unit 507, in these examples, provides for communications with other data processing systems or devices, including resources of server 102, domain 110, hardware 112A-N, storage 115A-N, and domain 130. In these examples, communications unit 507 includes one or more network interface cards. Communications unit 507 may provide communications through the use of either or both physical and wireless communications links. Program instructions and data used to practice embodiments of the present invention may be downloaded to persistent storage 505 through communications unit 507.

I/O interface(s) 506 allows for input and output of data with other devices that may be connected to each computer system. For example, I/O interface(s) 506 may provide a connection to external device(s) 508, such as a keyboard, a keypad, a touch screen, and/or some other suitable input device. External device(s) 508 can also include portable computer readable storage media, such as, for example, thumb drives, portable optical or magnetic disks, and memory cards. Software and data 512 used to practice embodiments of the present invention can be stored on such portable computer readable storage media and can be loaded onto persistent storage 505 via I/O interface(s) 506. I/O interface(s) 506 also connect to display 509.

Display 509 provides a mechanism to display data to a user and may be, for example, a computer monitor. Display 509 can also function as a touch screen, such as the display of a tablet computer or a smartphone.

Referring now to FIG. 6, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

FIG. 7 depicts a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Security 86 provides identity verification for cloud consumers and tasks, as well as protection for data and other resources. Security 86 also represents the functionality that is provided under the embodiments of the present invention.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and security policy control program 200, domain definition program 300.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for a managing security in a networked computing environment, the method comprising:
   detecting, by one or more processors, an unauthorized activity that is targeting a computing resource;
   determining, by one or more processors, a group of computing resources that includes the targeted computing resource;
   determining, by one or more processors, a first threat level for the detected unauthorized activity;
   identifying, by one or more processors, a first security policy of a plurality of security policies of a networked computing environment based at least in part on the determined group of computing resources and the determined first threat level for the detected unauthorized activity;
   re-evaluating, by one or more processors, on a periodic basis, the detected unauthorized activity;
   in response to re-evaluating the detected unauthorized activity, determining, by one or more processors, that the first threat level decreases to a second threat level;
   in response to determining that the re-evaluated unauthorized activity decreases to the second threat level, determining, by one or more processors, a second security policy associated with the group of computing resources and the second threat level; and
   identifying, by one or more processors, a reversion criteria corresponding to a computing resource of the group of computing resources, wherein the reversion criteria dictates one or more periods of time and one or more events that occur prior to one or more computing resources of the group of computing resources reverting from the first security policy to the second security policy.

2. The method of claim 1, further comprising:
   implementing, by one or more processors, the first security policy of the plurality of security policies among the group of computing resources; and
   wherein the group of computing resources includes two or more computing resources of the networked computing environment.

3. The method of claim 1, wherein determining the group of computing resources that includes the targeted computing resource further comprises:
   determining, by one or more processors, a relationship between the targeted computing resource and one or more other computing resources of the networked computing environment, wherein the relationship is based on one or more of: relatedness values indicating a relationship of the targeted computing resource to other computing resources of the networked computing environment, one or more software applications associated with the targeted computing resource, one or more security policies, and one or more predefined groupings of computing resources; and
   defining, by one or more processors, a group of related computing resources that includes the targeted computing resource and one or more other computing resources of the networked computing environment based, at least in part, on the determined relationship.

4. The method of claim 3, further comprising:
   determining, by one or more processors, a plurality of relatedness values that indicate a relationship of a computing resource relative to one or more other computing resources of the networked computing environment, wherein the plurality of relatedness values of the one or more other computing resources are based on at least one of:
   one or more interactions with the computing resource;
   data communicated with the computing resource;
   a frequency of interactions with the computing resource;
   data that resides on the computing resource; and
   determining, by one or more processors, the group of related computing resources that includes the computing resource based, at least in part on, the determined plurality of relatedness values that correspond to one or more other computing resources within the networked computing environment and a threshold value.

5. The method of claim 4, wherein the threshold value utilized to determine the group of related computing resources is based, at least in part, on the security policy, and at least one of:
   a predefined value;
   a value associated with a cost/risk analysis associated with implementing the security policy; and
   a threat level associated with the detected unauthorized activity.

6. The method of claim 1, further comprising:
   re-evaluating, by one or more processors, on a periodic basis, the detected unauthorized activity;
   determining, by one or more processors, that the determined first threat level increases to a third threat level based on the re-evaluated unauthorized activity;
   determining, by one or more processors, that the third threat level of the detected unauthorized activity is related to a third security policy; and determining, by one or more processors, a another group of related computing resources that are related to the targeted computing resource based, at least in part, on the third security policy.

7. A computer program product for managing security in a networked computing environment, the computer program product comprising:
one or more computer readable storage media having program instructions stored on the one or more computer readable storage media, the program instructions readable/executable by a one or more processor, the program instruction comprising:
program instructions to detect an unauthorized activity that is targeting a computing resource;
program instructions to determine a group of computing resources that includes the targeted computing resource;
program instructions to determine a first threat level for the detected unauthorized activity;
program instructions to identify a first security policy of a plurality of security policies of a networked computing environment based at least in part on the determined group of computing resources and the determined first threat level for the detected unauthorized activity;
program instructions to re-evaluate, on a periodic basis, the detected unauthorized activity;
program instructions to respond to re-evaluating the detected unauthorized activity by determining that the first threat level decreases to a second threat level;
program instructions to respond to determining that the re-evaluated unauthorized activity decreases to the second threat level by determining a second security policy associated with the group of computing resources and the second threat level; and
program instructions to identify a reversion criteria corresponding to a computing resource of the group of computing resources, wherein the reversion criteria dictates one or more periods of time and one or more events that occur prior to one or more computing resources of the group of computing resources reverting from the first security policy to the second security policy.

8. The computer program product of claim 7, further comprising:
program instructions to implement the first security policy of the plurality of security policies among the group of computing resources; and
wherein the group of computing resources includes two or more computing resources of the networked computing environment.

9. The computer program product of claim 7, wherein program instruction to determine the group of computing resources that includes the targeted computing resource further comprises:
program instructions to determine, a relationship between the targeted computing resource and one or more other computing resources of the networked computing environment, wherein the first relationship is based on one or more of: relatedness values indicating a relationship of the first computing resource to other computing resources of the networked computing environment, one or more software applications associated with the targeted computing resource, one or more security policies, and one or more predefined groupings of computing resources; and program instructions to define a group of related computing resources that includes the targeted computing resource and one or more other computing resources of the networked computing environment based, at least in part, on the determined relationship.

10. The computer program product of claim 9, further comprising:
program instructions to determine a plurality of relatedness values that indicate a relationship of a computing resource relative to one or more other computing resources of the networked computing environment, wherein the plurality of relatedness values of the one or more other computing resources are based on at least one of:
one or more interactions with the computing resource;
data communicated with the computing resource;
a frequency of interactions with the computing resource;
data that resides on the computing resource; and
program instructions to determine the group of related computing resources that includes the computing resource based, at least in part on, the determined plurality of relatedness values that correspond to one or more other computing resources within the networked computing environment and a threshold value.

11. The computer program product of claim 10, wherein the threshold value utilized to determine the second group of related computing resources is based, at least in part, on the security policy, and at least one of:
a predefined value;
a value associated with a cost/risk analysis associated with implementing the security policy; and
a threat level associated with the detected unauthorized activity.

12. The computer program product of claim 7, further comprising:
program instructions to re-evaluate, on a periodic basis, the detected unauthorized activity;
program instructions to determine that the determined first threat level increases to a third threat level based on the re-evaluated unauthorized activity;
program instructions to determine that the third threat level of the detected unauthorized activity is related to a third security policy; and
program instructions to determine a another group of related computing resources that are related to the targeted computing resource based, at least in part, on the third security policy.

13. A computer system for managing security in a networked computing environment, the computer system comprising:
one or more computer processors;
one or more computer readable storage media;
program instructions stored on the computer readable storage media for execution by at least one of the one or more computer processors, the program instructions comprising:
program instructions to detect an unauthorized activity that is targeting a computing resource;
program instructions to determine a group of computing resources that includes the targeted computing resource;
program instructions to determine a first threat level for the detected unauthorized activity;
program instructions to identify a first security policy of a plurality of security policies of a networked computing environment based at least in part on the determined group of computing resources and the determined first threat level for the detected unauthorized activity;

program instructions to re-evaluate, on a periodic basis, the detected unauthorized activity;

program instructions to respond to re-evaluating the detected unauthorized activity by determining that the first threat level decreases to a second threat level;

program instructions to respond to determining that the re-evaluated unauthorized activity decreases to the second threat level by determining a second security policy associated with the group of computing resources and the second threat level; and program instructions to identify a reversion criteria corresponding to a computing resource of the group of computing resources, wherein the reversion criteria dictates one or more periods of time and one or more events that occur prior to one or more computing resources of the group of computing resources reverting from the first security policy to the second security policy.

14. The computer system of claim 13, further comprising:
program instructions to implement the first security policy of the plurality of security policies among the group of computing resources; and
wherein the group of computing resources includes two or more computing resources of the networked computing environment.

15. The computer system of claim 13, wherein program instruction to determine the group of computing resources that includes the targeted computing resource further comprises:
program instructions to determine, a relationship between the targeted computing resource and one or more other computing resources of the networked computing environment, wherein the first relationship is based on one or more of: relatedness values indicating a relationship of the first computing resource to other computing resources of the networked computing environment, one or more software applications associated with the first targeted computing resource, one or more security policies, and one or more predefined groupings of computing resources; and
program instructions to define a group of related computing resources that includes the targeted computing resource and one or more other computing resources of the networked computing environment based, at least in part, on the determined relationship.

16. The computer system of claim 15, further comprising:
program instructions to determine a plurality of relatedness values that indicate a relationship of a computing resource relative to one or more other computing resources of the networked computing environment, wherein the plurality of relatedness values of the one or more other computing resources are based on at least one of:
one or more interactions with the computing resource;
data communicated with the computing resource;
a frequency of interactions with the computing resource;
data that resides on the computing resource; and
program instructions to determine the group of related computing resources that includes the first computing resource based, at least in part on, the determined plurality of relatedness values that correspond to one or more other computing resources within the networked computing environment and a threshold value.

17. The computer system of claim 16, wherein the threshold value utilized to determine the group of related computing resources is based, at least in part, on the security policy, and at least one of:
a predefined value;
a value associated with a cost/risk analysis associated with implementing the security policy; and
a threat level associated with the detected unauthorized activity.

18. The computer system of claim 13, further comprising:
program instructions to re-evaluate, on a periodic basis, the detected unauthorized activity;
program instructions to determine that the determined first threat level increases to a third threat level based on the re-evaluated unauthorized activity;
program instructions to determine that the third threat level of the detected unauthorized activity is related to a third security policy; and
program instructions to determine a another group of related computing resources that are related to the targeted computing resource based, at least in part, on the third security policy.

* * * * *